June 20, 1939. A. PELLOW 2,163,130
MULTIFOCAL LENS AND METHOD OF MAKING THE SAME
Filed March 12, 1937 2 Sheets-Sheet 1
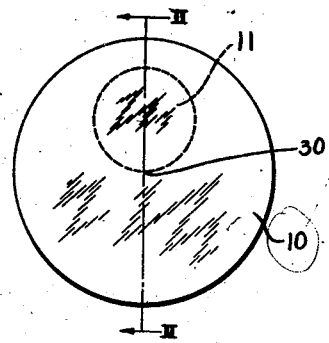
Fig. I
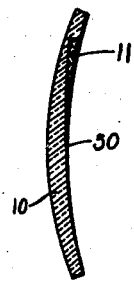
Fig. II
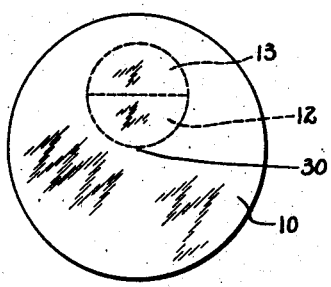
Fig. Ia
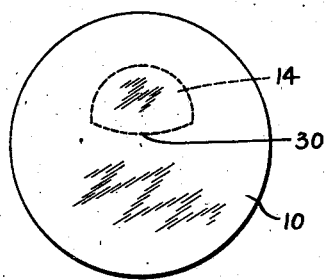
Fig. Ib
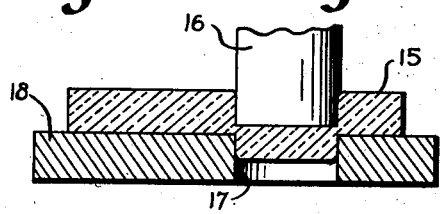
Fig. III
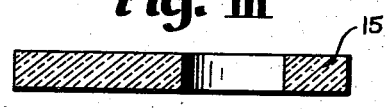
Fig. IV
Fig. V
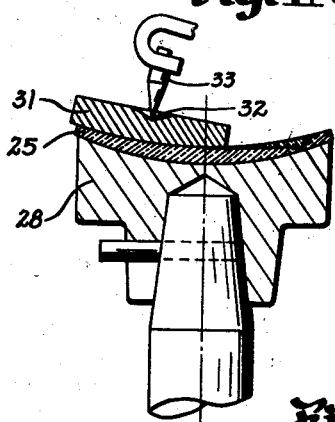
Fig. IVa
Fig. VI
Fig. VII
Fig. VIII
INVENTOR
ARTHUR PELLOW
BY
Harry H. Styll
ATTORNEY

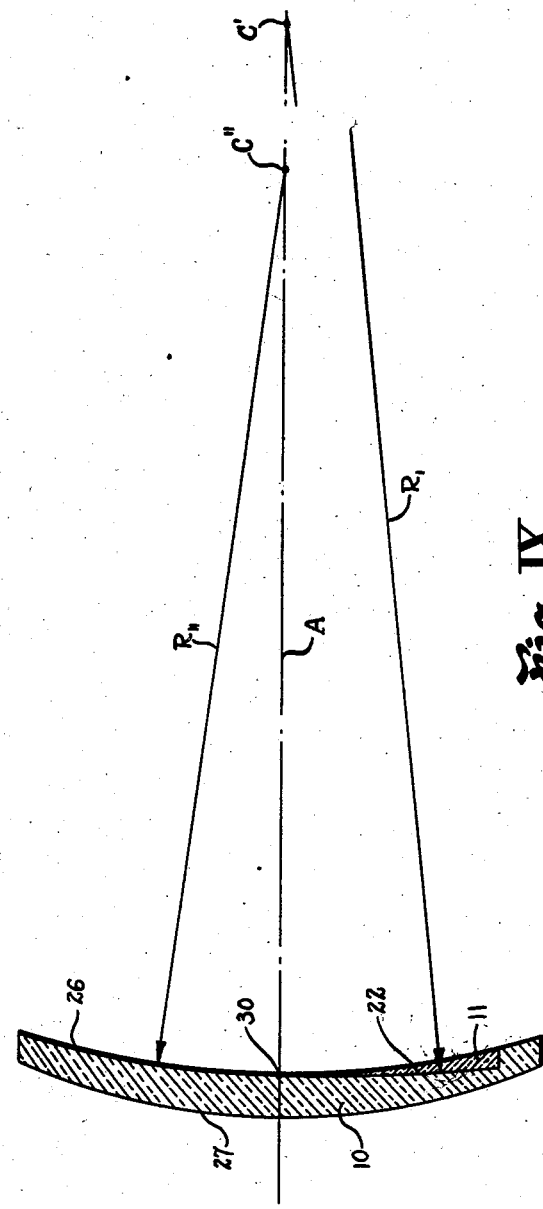

Patented June 20, 1939

2,163,130

UNITED STATES PATENT OFFICE 2,163,130

MULTIFOCAL LENS AND METHOD OF MAKING THE SAME

Arthur Pellow, Southbridge, Mass., assignor to American Optical Company, Southbridge, Mass., a voluntary association of Massachusetts Application March 12, 1937, Serial No. 130,536

6 Claims. (Cl. 88—54)

This invention relates to a multifocal lens and more particularly to a multifocal lens having a large field for close work.

An object of the invention is to provide a multifocal lens having a relatively small field for distance set into a larger field for near vision, the two fields being monaxial with a minimum of "jump" in passing from one field to the other.

In the accompanying drawings which illustrate my invention Fig. I is a view in elevation of such a lens;

Fig. Ia is a similar view of a modified form of lens embodying my invention;

Fig. Ib is a similar view of another modified form of lens embodying my invention;

Fig. II is a sectional view taken on the line II—II of Fig. I;

Fig. III is a diagrammatic view in section illustrating one step in the production of a lens such as illustrated in Figs. I and Ia;

Fig. IV illustrates the blank of Fig. III following a subsequent step of the process;

Fig. IVa illustrates an alternative step in the process;

Fig. V illustrates the blank produced by either of the alternative methods;

Fig. VI illustrates the assembling of two blanks to make a composite lens blank;

Fig. VII illustrates the optical surfaces which are to be ground on the opposed faces of this bank;

Fig. VIII illustrates the blocking of the blank for generating one of these optical surfaces; and Fig. IX is a diagrammatic view illustrating the relation of the centers of the various surface curvatures of the lens.

With certain types of work, a wearer of ophthalmic lenses is handicapped by lenses having a relatively small reading field. For instance, a surgeon may require lenses for clear vision when performing an operation and find himself hampered by the size of the reading field in the usual bifocal lens. There are other instances where workers are handicapped by the small size of the reading field of those types of bifocal lenses in general use. On the other hand, the use of ophthalmic lenses having but a single field, that is, a field for near vision, is sometimes objectionable because it may be convenient to look up from the close work to see a person, an instrument or some object at a distance. Lenses with a single field do not permit clear vision when the distance of the objects viewed is considerably varied if the person is presbyopic.

In accordance with my invention, I provide an ophthalmic lens having a relatively large field suitable for close work and a smaller field through which distance vision is afforded. The full advantages of a lens embodying my invention will be more readily understood after a description of the manner of making such a lens, and its construction.

A simple form of lens embodying my invention is shown in Fig. I, this lens providing a large field 10 for close work and a small field 11 set into the large field, the small field being of a suitable focal length for distance vision. In the remainder of this specification the term "reading field" will be used to indicate a field for near vision such as the field 10, even though the worker may use this field for other purposes than reading.

Fig. Ia illustrates a similar lens in which the smaller field is divided into a portion 12 for intermediate vision and a portion 13 for distance vision. Fig. Ib illustrates a similar lens in which I provide a wider path of entry from the portion of the reading field most used into the distance field 14.

Referring to Fig. III, I have illustrated diagrammatically the forming of an opening in one side of a blank of glass 15. A plunger 16 is used in cooperation with a socket 17 in a table 18 to push a portion of the glass of the blank 15 into the socket 17. This operation is, of course, performed while the glass 15 is hot enough to be plastic. The plunger 16 is not punched clear through the blank 15 because of the imperfection which might be created around the opening during the latter part of the punching operation. By stopping short of complete severing of the glass forced into the socket 17, an improved product is obtained.

The opening is provided in the blank 15 to receive a button of glass of a suitable index of refraction for producing the distance field 11 of the form of lens shown in Fig. I, or a two-part button of two different glasses of suitable indices of refraction for producing the multifocal fields 12, 13 of the form of lens shown in Fig. Ia.

There are two alternative method steps, illustrated respectively in Figs. IV and IVa, which may be followed. I will first describe the method to which Fig. IV pertains. When the blank treated as illustrated in Fig. III has cooled down, I grind away glass from the side of the blank which is the lower side in Fig. III; and I remove enough glass to expose the opening in the blank. The blank, as illustrated in Fig. IV, is the result of this grinding operation. A button 20 shaped substantially to the finished contour shape desired of the finished distance field is fitted within the opening in the blank 15 and fusion is carried on in accordance with well known practice for obtaining the blank illustrated in Fig. V. The glass of the button 20 preferably has a higher melting point than the glass of the blank 15. During fusion the blank 15 will melt sooner than the button and will thereby flow to the shape of the contour of the edge of the button. This, therefore, obviates the necessity of having to accurately dimension the opening in the blank or require that the button fit accurately in said opening. The coefficients of expansion of the glasses of the blank and button are so controlled that accurate fusion takes place.

According to the alternative step to which Fig. IVa pertains, a button 20a, is fused in the opening in the blank illustrated in Fig. III while resting on the bottom of that opening. The button 20a fuses not only to the side walls of the opening in the blank 15 but also to the bottom of that opening. After the blank has cooled down, glass is ground away from the side of the blank which is lowermost in Fig. IVa to expose the button 20a. The result of this step is a blank such as illustrated in Fig. V. The results of the two alternative process steps just described are essentially the same.

The focal power of the distance field 11 can be regulated by grinding an optical surface of a predetermined curvature on one side of the blank 15. If the method includes the step illustrated in Fig. IVa, this optical surface can be obtained as the final product of the step of grinding away the glass when exposing the button 20a. Of course, if the method includes the step illustrated in Fig. IV, this optical surface is produced on the blank after the button 20 has been fused in the opening in the blank. The character of this optical surface on the blank is influenced, or course, by the indices of refraction of the glasses of which the different component parts of the blank are made and by the optical properties desired in the finished lens. In the example illustrated in Figs. III and VII inclusive the blank 15 is made of a glass of lower index, such as crown glass, than the button 20 or 20a, which may be of flint glass. The optical surface placed on blank 15 may be convex, plane or concave depending on the focal power desired for field 11.

After the optical surface above referred to has been produced on the blank 15 as indicated at 22 in Fig. VI, an optical surface substantially contrageneric thereto is produced on a second blank 23, this contrageneric surface being indicated at 24 in Fig. VI. The two blanks 15 and 23 are then fused together to produce the fused blank shown in Fig. VII and indicated in general by the numeral 25.

This blank is then surfaced on the opposed sides thereof to produce the finished lens. The opposed surfaces are indicated in Fig. VII by the broken lines 26 and 27. Fig. VIII illustrates the production of one of these surfaces. The lens blank 25 is shown mounted on a block 28. In order to provide a lens having minimum "jump" when passing from the field 10 to the field 11, I so produce the contrageneric surfaces 22 and 24 and the ocular surface 26 that the center of curvature C" of the latter surface is on an axis A normal to the contrageneric surfaces at a point approximately in the periphery of the segment. In the examples illustrated, this axis A passes through the point 30 in each of Figs. I, Ia and Ib.

As above indicated, the surface 22 may be concave, a plane surface, or convex as shown. If the surface 22 is to be plane, the axis A, see Fig. IX, referred to as passing through the point 30, should be perpendicular to the surface 22 and the latter should be so produced. If the surface 22 is to be concave or convex, this blank is blocked so that the center of the concave or convex surface produced is on the indicated axis A. Such blocking is familiar to those skilled in generating the surfaces of lenses.

The outer surface 26 should also have its center on the indicated axis A; and, I accordingly block the blank 25 in the manner indicated in Figs. VIII and IX so that the axis of rotation of the block coincides with the indicated axis A. The surface 26 may be produced by means of a generating lap 31 having a universal connection at 32 with a crank arm 33. The procedure illustrated in Fig. VIII may be taken as typical of the generation of not only the surface 26 but also the surface 22.

Accordingly, I have eliminated or reduced to an insignificant amount the "jump" in passing from the reading field to the distance field, due to placing both the center C' of surface 22 and the center C" of surface 26 on the axis A referred to as passing approximately through the point 30. The curvature imparted to the surface 27 determines the power of the lens; therefore this surface may be left to be put on by the person who supplies the lens to a particular prescription. In other words, the lens blank may be finished except for the surface 27 at the factory. Then at the shop where the prescription is to be filled the surface 27 is put on to complete the particular lens required. It is not necessary that the axis of the finished lens coincide with the axis common to the centers of surfaces 22 and 26; although it is desirable that the axis of the finished lens be in the part of the field 10 which is most used, that is about the point 30.

If we let R' be the radius of the interface, that is the contrageneric surfaces which were fused together, and let R" be the radius of the ocular surface 26, and if we indicate the index of refraction of the glass of the blanks 15 and 23 by $n''$ and indicate the index of refraction of the glass of button 20 by $n'$, the field 11 is stronger than the field 10 by the addition $$(n'-n'')\cdot\left(\frac{1}{R'}+\frac{1}{R''}\right)$$

As a matter of fact the radius R' is longer than the radius R" and the latter is negative so that the addition is a minus quantity, which makes the field 11 actually the weaker of the two. The field 11 was of course designed to be the distance field.

An example is the following: The interface has a radius of infinite length, that is the interface is a plane surface intersecting the axis A at right angles. The button 20 is of flint glass having an index of refraction $n'=1.70$. The blanks 15 and 23 are of crown glass having an index of refraction $n''=1.523$. The outer surfaces 27 and 26 are respectively $a+8$ and $a-6$, these being the curves produced by standard $+8$ and $-6$ laps. The overall thickness of the lens adjacent the point 30 is 3.5 mm. The diameter of the segment 11 is approximately 20 mm. The focal power of the field 10 is 2.12 diopters (by actual test), and that of the field 11 is approximately 0.16 diopter (by actual test).

The button 20 or 20a as originally inserted in the blank 15 has material thickness throughout its area. If the grinding of the blank 25 to produce the surface indicated by the broken line 26 is carried far enough, the segment will have adjacent the axis 30 substantially a knife-like edge. The edge gradually thickens starting from this point in either direction about the periphery of the segment. This is advantageous since it reduces the visibility of the line of separation between the fields 10 and 11.

If a fairly wide area for distance vision as soon as the distance field is entered is a desirable feature, a button of the shape shown at 14 in Fig. 1b is employed. This requires a corresponding change in the shape of the punch 16, 17, 18 which forms the recess for the reception of this button. The form of lens shown in Fig. 1b requires less raising movement of the eye to reach a place where ample distance vision is afforded; but the reading field is somewhat more restricted than in the first form of lens.

The form of lens shown in Fig. 1a can be made in the same way that the form shown in Fig. 1 is made, except that a two-part button 12, 13 is used in place of button 20 or 20a. The two-part button is readily obtained, as is well known among lens manufacturers, by edge fusing two pieces of glass together of suitable different indices of refraction.

The production of multifocal lenses in accordance with my invention is capable of considerable variation. The segment itself may be made of colored glass or a glass of a character which eliminates substantially all of the ultra violet or infra red rays or both from the light transmitted. The same is true of the field 10; and moreover, if desired both fields may be of glass having either color or absorption characteristics, or both.

There are superimposed layers of glass in the field 11, and this makes it possible to control the dispersion values of the two superimposed glasses so as to avoid creating a color curtain in this field. The same is true of buttons 12, 13 and 14.

In the example which has been above described in detail, the blank 15 with the exception of the inserted button was of glass of substantially the same index of refraction as that of the glass in the blank 23. The characteristics of the lens can be considerably varied by using glass of a different index of refraction for the blank 23 from the glass used for the blank 15. As a specific example a lens may be produced by fusing together a blank 23 of Barium Crown glass having an index of refraction of approximately 1.61 and a blank 15 of ophthalmic crown glass having an index of refraction of approximately 1.523 with an inserted button of flint glass having an index of refraction of approximately 1.70. This arrangement enables the designer to lay out his lens with flatter surface curvatures.

A trifocal lens is obtained in the example just given if the blank 25 has enough glass removed from a portion of one side thereof in the finished blank so that said portion is ground through to the layer of glass of the opposite side.

As above indicated, it is not necessary that the field 11 be circular, as the designer can use an insert 20 or 20a of a different shape by correspondingly altering the shape of the plunger 16 and socket 17.

It is obvious that the segment may be produced with prism in accordance with the wearer's prescription. Such prism may be either base in or base out. According to well known principles, the tilting of the ocular surface relative to the interface controls the prism produced in the segment: In other words, the shifting of the center of curvature of one of these surfaces relative to the center of curvature of the other introduces the desired prism. Furthermore, the designer has the possibility, if he is willing to forego the monaxial properties discussed above, of arranging the segment with prism base up or base down. The surfacing operation which puts the prescription curve 27 on the lens does not alter the prism already introduced into the segment by the relative generation of the surfaces 22 and 26.

In this connection it should be noted in relation to ophthalmic lenses there is some looseness in the use of the term monaxial. Those who use the term monaxial in its strictest sense require that there be but one axis in the lens, that is, a common axis for both the reading field and for the distance field. In the present specification the term monaxial is used in its looser sense as requiring merely that the centers of curvature of the opposed faces of the segment, namely the interface and the ocular surface, be on a common axis passing through the border of the segment as above specified. In this sense the essentials for a monaxial lens are determined by the essentials for freedom from "jump."

The advantages of a "jumpless" line of separation between two fields in a multifocal lens are so well known that it is not necessary to discuss further the advantage of producing the interface and the ocular surface of the lens monaxially according to the teachings of my invention in the above description. In its broadest aspect my invention is not limited, however, to this "jumpless" feature; and if the designer decides to forego this feature, he may shift about the center of curvature of the interface as mentioned above. Moreover, he may choose glasses of two different indices of refraction for the blanks 15 and 23 respectively, and then shift the center of the interface so that the latter intersects either the ocular surface 26 or the front surface 27 within the area of the lens. Various other modifications will suggest themselves to those skilled in lens manufacture and design, hence it will be understood that while certain illustrative embodiments of the invention are set forth in the drawings and in this description, the invention may be otherwise embodied and practiced within the scope of the following claims.

I claim:

1. A blank for a multifocal lens having a relatively small distance vision field and a relatively large near vision field comprising a major piece of lens medium of a relatively low index of refraction having an opening therein, a minor piece of lens medium of a higher index of refraction secured in said opening, said composite pieces of lens medium having a continuous surface on one side thereof, a second major piece of lens medium of sensibly the same index of refraction as the first major piece secured to said continuous surface and overlying the minor high index piece of lens medium, said composite pieces of lens medium having an exposed surface curvature of a radius which is shorter than the radius of curvature of the first continuous surface, said exposed surface curvature extending over the minor high index piece of lens medium and cooperatively functioning with the indices of refraction of said composite pieces of lens medium and with said first continuous surface throughout the minor piece of lens medium to control the difference in power desired between the distance focal field, as produced by said minor piece of lens medium and the near vision field and simultaneously producing a controlling element of the resultant focal power desired of the relatively large near vision field, said exposed surface intersecting said first continuous surface adjacent the edge of said high index piece of lens medium disposed toward the center of the blank and causing the optical center of said relatively small distance field to be positioned adjacent said point of intersection and the said minor high index portion to be thinner adjacent said edge than throughout the remainder of its contour.

2. A multifocal lens having a relatively small distance vision field and a relatively large near vision field comprising a major piece of lens medium of a relatively low index of refraction having an opening therein, a minor piece of lens medium of a higher index of refraction secured in said opening, said composite pieces of lens medium having a continuous surface on one side thereof, a second major piece of lens medium of sensibly the same index of refraction as the first major piece secured to said continuous surface and overlying the minor high index piece of lens medium, said composite pieces of lens medium having an exposed surface curvature of a radius which is shorter than the radius of curvature of the first continuous surface, said exposed surface curvature extending over the minor high index piece of lens medium and cooperatively functioning with the indices of refraction of said composite pieces of lens medium and with said first continuous surface throughout the minor piece of lens medium to control the difference in power desired between the distance focal field, as produced by said minor piece of lens medium, and the near vision field and simultaneously producing a controlling element of the resultant focal power desired of the relatively large near vision field, said exposed surface intersecting said first continuous surface adjacent the edge of said high index piece of lens medium disposed toward the center of the blank and causing the optical center of said relatively small distance field to be positioned adjacent said point of intersection and the said minor high index portion to be thinner adjacent said edge than throughout the remainder of its contour and an optical surface on the outer side of said second piece of lens medium which with the exposed surface on said composite layer produces the resultant focal power desired in the relatively large near vision field of the lens.

3. The method of forming a blank for a multifocal lens having a relatively small distance vision field and a relatively large near vision field comprising forming a major piece of lens medium of a relatively low index of refraction with an opening therein, securing a minor piece of lens medium of a higher index of refraction in said opening in edge to edge relation with said major piece of lens medium, forming a continuous surface on one side of said composite pieces of lens medium of a controlled relatively long radius of curvature, securing a second major piece of lens medium of sensibly the same index of refraction as the first major piece to said continuous surface with a portion thereof overlying the minor high index piece of lens medium, forming a continuous surface on the exposed side of said composite pieces of lens medium to a controlled radius of curvature which is shorter than the radius of curvature of the first continuous surface by an amount to introduce the difference in the power desired between the distance focal field, as produced by the minor piece of lens medium, and the relatively large near vision field and to simultaneously produce a controlling element of the resultant focal power desired of said relatively large near vision field, said surface being formed so as to intersect said first continuous surface adjacent the edge of said high index piece of lens medium disposed toward the center of the blank so as to cause the optical center of said relatively small distance field to be positioned adjacent said point of intersection and the said minor high index portion to be thinner adjacent said edge than throughout the remainder of its contour.

4. The method of forming a multifocal lens having a relatively small distance vision field and a relatively large near vision field comprising forming a major piece of lens medium of a relatively low index of refraction with an opening therein, securing a minor piece of lens medium of a higher index of refraction in said opening in edge to edge relation with said major piece of lens medium, forming a continuous surface on one side of said composite pieces of lens medium of a controlled relatively long radius of curvature, securing a second major piece of lens medium of sensibly the same index of refraction as the first major piece to said continuous surface with a portion thereof overlying the minor high index piece of lens medium, forming a continuous surface on the exposed side of said composite pieces of lens medium to a controlled radius of curvature which is shorter than the radius of curvature of the first continuous surface by an amount to introduce the difference in the power desired between the distance focal field, as produced by the minor piece of lens medium, and the relatively large near vision field and to simultaneously produce a controlling element of the resultant focal power desired of said relatively large near vision field, said surface being formed so as to intersect said first continuous surface adjacent the edge of said high index piece of lens medium disposed toward the center of the blank so as to cause the optical center of said relatively small distance field to be positioned adjacent said point of intersection and the said minor high index portion to be thinner adjacent said edge than throughout the remainder of its contour, and forming an optical surface on the outer side of said second piece of lens medium which with the exposed surface on said composite layer will introduce the resultant focal power desired in the relatively large near vision field of the lens.

5. A blank for a multifocal lens having a relatively small distance vision field and a relatively large near vision field comprising a major piece of lens medium of a relatively low index of refraction having an opening therein, a minor piece of lens medium of a higher index of refraction secured in said opening, said composite pieces of lens medium having a continuous surface on one side thereof of a controlled relatively long radius, a second major piece of lens medium of sensibly the same index of refraction as the first major piece secured to said continuous surface and overlying the minor high index piece of lens medium, said composite pieces of lens medium having a surface on the side thereof on which the minor piece is supported overlying said minor piece and of a controlled shorter radius of curvature than the radius of said continuous surface and intersecting said continuous surface adjacent the edge of said high index piece of lens medium which is disposed toward the center of the blank and causing the said minor piece of high index lens medium to have a minus power, with the optical center thereof positioned adjacent said point of intersection, and the adjacent edge of said high index piece of lens medium to be relatively thin as compared with the remainder of its contour.

6. A multifocal lens having a relatively small distance vision field and a relatively large near vision field comprisnig a major piece of lens medium of relatively low index of refraction having an opening therein, a minor piece of lens medium of a higher index of refraction secured in said opening, said composite pieces of lens medium having a continuous surface on one side thereof of a controlled relatively long radius, a second major piece of lens medium of sensibly the same index of refraction as the first major piece secured to said continuous surface and overlying the minor high index piece of lens medium, said composite pieces of lens medium having a surface on the side thereof on which the minor piece is supported overlying said minor piece and of a controlled shorter radius of curvature than the radius of said continuous surface and intersecting said continuous surface adjacent the edge of said high index piece of lens medium which is disposed toward the center of the blank and causing the said minor piece of high index lens medium to have a minus power, with the optical center thereof positioned adjacent said point of intersection, and the adjacent edge of said high index piece of lens medium to be relatively thin as compared with the remainder of its contour, and an optical surface on the exposed side of said second piece of lens medium which, in combination with the outer surface on said composite layer, produces the resultant focal power desired in the relatively large near vision field of the lens.

ARTHUR PELLOW.